(12) United States Patent
Lederer

(10) Patent No.: US 9,967,138 B2
(45) Date of Patent: May 8, 2018

(54) METHOD FOR CONFIGURING AN APPLICATION

(71) Applicant: Unify GmbH & Co. KG, Munich (DE)

(72) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 670 days.

(21) Appl. No.: 14/492,371

(22) Filed: Sep. 22, 2014

(65) Prior Publication Data

US 2015/0012587 A1     Jan. 8, 2015

Related U.S. Application Data

(63) Continuation of application No. 13/120,040, filed as application No. PCT/EP2008/008142 on Sep. 25, 2008, now Pat. No. 8,910,150.

(51) Int. Cl.
*G06F 9/445*     (2018.01)
*H04L 12/24*     (2006.01)
(Continued)

(52) U.S. Cl.
CPC ...... *H04L 41/0806* (2013.01); *G06F 9/44505* (2013.01); *G06F 17/30876* (2013.01);
(Continued)

(58) Field of Classification Search
None
See application file for complete search history.

(56) References Cited

U.S. PATENT DOCUMENTS 6,792,607 B1    9/2004    Burd et al.
7,089,553 B1    8/2006    Glaser et al.
(Continued)

FOREIGN PATENT DOCUMENTS

EP     1372060 A2    12/2003
WO    01/79998 A2    10/2001
(Continued)

OTHER PUBLICATIONS

International Search Report for PCT/EP2008/008142 dated Dec. 18, 2008 (Form PCT/IS/210) (German Translation).
(Continued)

*Primary Examiner* — Chuck Kendall
(74) *Attorney, Agent, or Firm* — Buchanan Ingersoll & Rooney PC

(57) ABSTRACT

A method and system for automatically configuring an application after downloading the same via a website such as an enterprise web application that is installed on a server in a customer network. A "one-touch configuration" method simplifies the initial configuration of the application to be installed, and makes manual entries after installation unnecessary. The method according to the invention is further applicable to obtaining applications from the Internet, wherein a customer has an account with a provider. The customer logs in using the customer login thereof at the website of the company. The company is aware of which applications the customer has purchased, by means of the customer account information, and can proved corresponding supplementary downloads, including a licensing key. The licensing key can then be transmitted to the installed application in a simple manner using the method presented.

20 Claims, 1 Drawing Sheet

(51) Int. Cl.
  *H04L 29/06* (2006.01)
  *H04L 29/08* (2006.01)
  *G06F 17/30* (2006.01)

(52) U.S. Cl.
  CPC .............. *H04L 67/02* (2013.01); *H04L 67/10* (2013.01); *H04L 67/141* (2013.01); *H04L 67/34* (2013.01); *H04L 67/42* (2013.01); *H04L 69/00* (2013.01)

(56) References Cited

U.S. PATENT DOCUMENTS

| | | | |
|---|---|---|---|
| 7,103,627 B2 * | 9/2006 | Kittredge | G06F 17/30893 707/E17.117 |
| 2002/0099795 A1 | 7/2002 | Betros et al. | |
| 2003/0200292 A1 | 10/2003 | Kemp et al. | |
| 2004/0148375 A1 | 7/2004 | Levett et al. | |
| 2005/0108706 A1 | 5/2005 | McCain | |
| 2006/0155672 A1 | 7/2006 | Lee et al. | |
| 2007/0100969 A1 | 5/2007 | Hu | |
| 2008/0141244 A1 | 6/2008 | Kelley | |

FOREIGN PATENT DOCUMENTS

| | | |
|---|---|---|
| WO | 02/065283 A2 | 8/2002 |
| WO | 2007/149671 A2 | 12/2007 |
| WO | 2008/070050 A2 | 6/2008 |

OTHER PUBLICATIONS

Written Opinion of the International Searching Authority PCT/EP2008/008142 dated Dec. 18, 2008 (Form PCT/IS/210) (German Translation).
International Search Report for PCT/EP2008/008142 dated Dec. 18, 2008 (Form PCT/IS/210) (English Translation).
International Preliminary Report on Patentability for PCT/EP2008/008142 dated Mar. 29, 2011 (Form PCT/IB373, PCT/ISA1237) (German Translation).
International Preliminary Report on Patentability for PCT/EP2008/008142 dated Mar. 29, 2011 (Form PCT/IB373, PCT/ISA1237) (English Translation).
Written Opinion of the International Searching Authority PCT/EP2008/008142 dated Dec. 18, 2008 (Form PCT/IS/210) (English Translation).

* cited by examiner

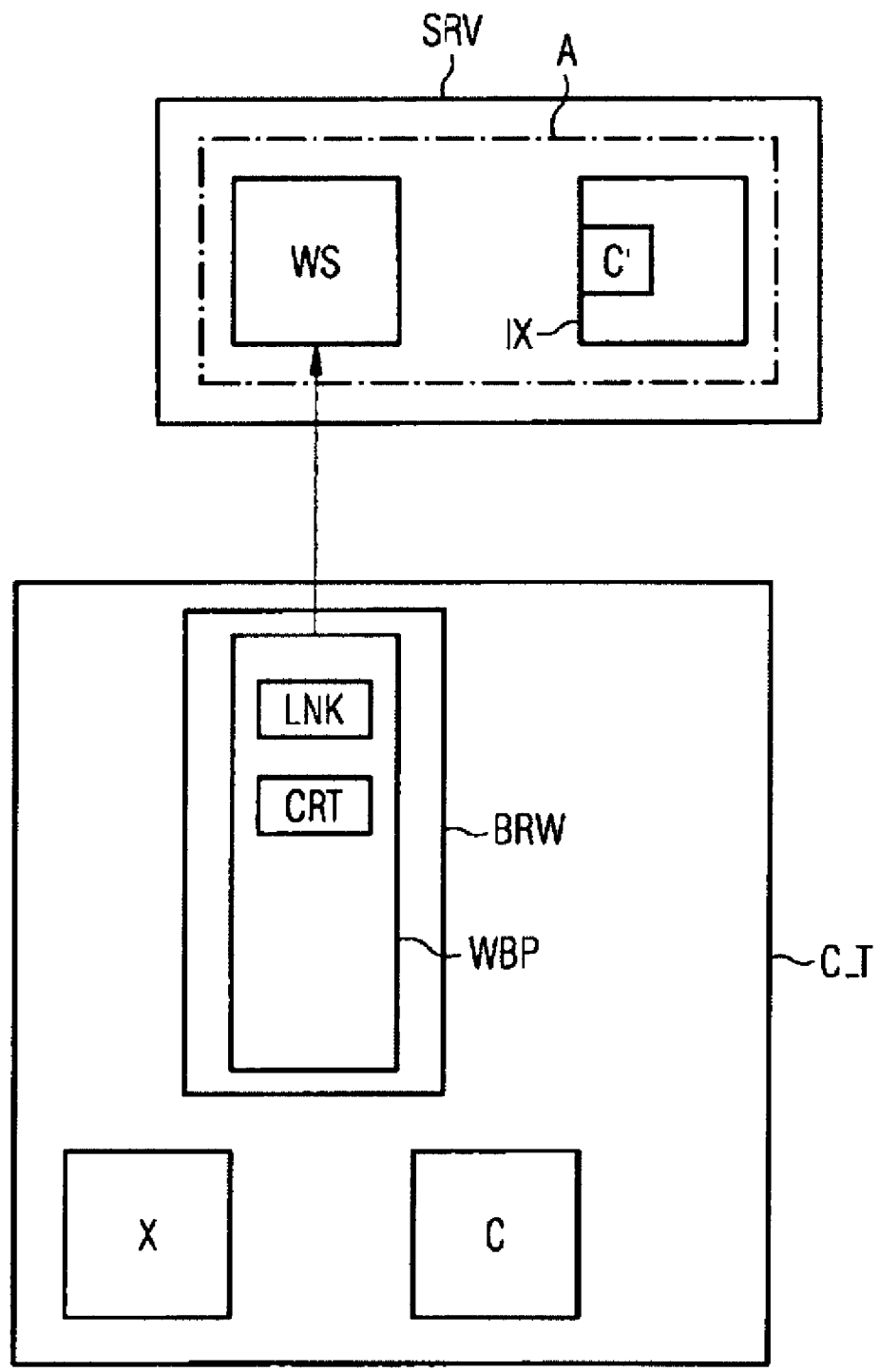

METHOD FOR CONFIGURING AN APPLICATION

CROSS-REFERENCE TO RELATED APPLICATIONS

This application is a continuation application of U.S. patent application Ser. No. 13/120,040, which is the United States national phase under 35 U.S.C. § 371 of PCT International Patent Application No. PCT/EP2008/008142, filed on Sep. 25, 2008.

BACKGROUND OF THE INVENTION

Field of the Invention

Embodiments of the invention concern a method for configuring an application.

It is common practice to download installation files to install an application via a data connection and to store them on a local computer system. After downloading and local storage of one or more installation files, the respective application can be installed on the local computer system.

A download of the respective installation file or the application in the form of an executable file is implemented with a data connection which is established with an appropriate server where said files are stored. The data connection is usually established via a browser of the local computer system or via access to enabled network drives.

Following the successful installation of the application, usually a configuration of the application is required. In the case of a client-server or Web application, for instance, a URL (Uniform Resource Locator) is entered for an associated server with which the Web application will work while in operation. In addition, it might be necessary to enter or transfer login credentials allowing automatic authorization of the Web application at an associated server.

Such an input of configuration data after local installation of the application is considered impractical in many cases. Duplications could result when inputting the authorization data, for instance, if a login is already required to download the installation files and then has to be re-entered with the related login information for the already installed application.

Another example involves downloading installation files via a network connection using an enabled network drive, where access requires authorization but the authorization data are transmitted automatically by the local computer system. This is the case, for instance, within company intranet networks, where a corresponding network drive can be enabled only with stored authorization data and usually automatically, i.e., without requiring an access-dependent input. In addition, companies usually have automatic access to company databases, or corporate directories, which assign each employee individual communication data as well as server configurations, enabled network drives, etc. on a call-up basis. For such company networks, any configuration following installation is time-consuming and considered impractical by companies in which updates and configuration measures are normally processed automatically without any action by the operator of the local computer system.

BRIEF SUMMARY OF THE INVENTION

It would be desirable to simplify the configuration of an application obtained via download and installed.

One method for configuring an application consisting of a server-side portion of the application, installed on a server computer system, and a client-side portion of the application, which is to be installed and configured on a client computer system, involves the following procedural steps.

After the client computer system accesses a web server assigned to the server-side portion of the application, a download page is generated by the web server. The server-side portion of the application, in its most generic form, corresponds in this case to an installation of the application on a server, which can already be set up for certain needs of a target group at which the download is directed. The client-side portion of the application corresponds to the portion of the application to be installed on the client-side computer system. The client-side and server-side portions of the application may, in general form, be identical; however, especially in the case of so-called Web-applications, often installations are used in which a server-side portion of the application works together with a client-side portion of the application, wherein the client-side portion has different tasks and functions which are shared.

According to the invention, the download page generated by the web server application contains configuration data to configure the client-side portion of the application and is loaded into the client computer system in a browser. For example, the download page is designed in the known HTML (Hypertext Markup Language) format and contains the configuration data in HTML Source Code.

In the next step, the client-side portion of the application is transferred and/or downloaded. After a successful and complete download of the installation files and/or the executable files of the client-side portion of the application, the application is installed on the client computer system.

In a subsequent step, the client-side portion of the application is configured, and this configuration must occur based on the invented means and not via user input, but automatically, i.e., using configuration data from the download page.

With the presented method of the invention, initial configuration of the application to be installed on the client computer system is unnecessary. This is advantageous since the user does not have to deal with inputs which often are considered time-consuming. Also, such manual inputs can be flawed. The invention thus contributes to a configuration with fewer mistakes.

In one advantageous embodiment of the invention, it is possible to store and/or install an additional configuration component on the client computer system and to start it after the successful installation of the client-side portion of the application. For this purpose, a local client-server connection is established between the configuration component acting as server and the browser acting as client, wherein the configuration data of the download page which has been loaded to the browser are transmitted to the configuration component via the local client-server connection. Such a local client-server connection is especially advantageous when the security settings of the browser prohibit direct acceptance of the configuration data from a remote location, i.e., the storage location of the web server application on the server computer system. Such a connection between a local server and a local client is also called a "local host" connection in the industry. In this embodiment, the client-side portion of the application is configured by said configuration component using the configuration data from the download page.

Another advantageous embodiment of the invention provides for the deletion of the configuration component after successful installation and configuration of the application, in order to free up resources on the client computer system.

According to another embodiment of the invention, the download page is designed such that it contains a control element, e.g., a selectable link to the storage location of the web server, as well as another control element, e.g., a button whose activation triggers the configuration according to the invention.

In an alternative embodiment, a sequence control consisting of download, installation, and configuration may also be controlled by a script.

Configuration of the client-side portion of the application is triggered, for instance, by entering the configuration data in a registration database ("registry") or in one or more configuration files.

According to another advantageous embodiment of the invention, access by the client computer system to the web server application is granted only after appropriate authentication of a user on the client computer system. Such authentication usually requires a login consisting of a user ID and corresponding password. As an alternative, authentication can also be handled by a transfer of authorization data as part of establishing a data connection to the web server using authorization data stored in the client computer system. Such authorization data will be automatically transmitted, for instance, when a network drive is accessed which is only accessible to certain users or user groups. According to the invention, the mentioned authorization data can be used to identify an individual user and transmit associated processed configuration data to configure the client-side portion of the application. If the configuration data consist only of a user name and associated password, these can be identical with authorization data also consisting of user ID and password.

An example with additional advantages and embodiments of the invention is illustrated below and explained in greater detail based on the drawings.

BRIEF DESCRIPTION OF THE FIGURE

The single FIGURE shows a simplified diagram to explain the interaction of individual components according to the invention.

DETAILED DESCRIPTION OF THE INVENTION

At this point, the industry knows of applications which are run on a server computer system. Such web applications receive transmitted request data from a client computer system, process them and provide corresponding result data to the client computer system. The request data, for instance, will be input in a web page provided by the server computer system and loaded into a client system in a browser. The request data are transmitted to the server computer system and are processed there. As a result of this processing, corresponding result data will be calculated on the server computer system and transmitted to the client computer system. An example for such a web application is a service that receives one or more search terms as request data and returns web pages as result data containing one or a combination of several search terms.

The industry currently uses web applications or web browser-based applications in which an application executed on a server computer system cooperates with an application executed on the client computer system. In the language of the industry this involves a server-side portion of the application and a client-side portion of the application. An example for this would be an application by Google, Inc., CA, USA called "Google Earth," (a trademark of Google, Inc.) which requires previous installation of the client-side portion of the application before it can be operated. The client-side portion of the application controls a moving presentation of geographical maps and cooperates with a server-side portion so that map data requested by the client-side portion are assigned and transmitted by the server-side portion. With this type of functional distribution between a server computer system and a client computer system, it is possible to achieve a far more efficient presentation, allowing smoothly flowing display of the maps despite the lack of complete storage of the map data on the client computer system.

The invention presented here is, however, not limited to a different design of the server-side and client-side portions of the application for the purpose of job sharing. The invention also comprises applications where the server-side portion differs from the client-side portion only in that the installed client-side portion has been configured or customized with certain configuration data. In other words, the invented method also allows the installation and configuration of applications where a server-side portion of the application is installed on a server computer system. This server-side portion of the application must be installed on a client computer system with the means provided by the invention or at least nearly identical means, wherein appropriate configuration of the client-side portion must be provided after installation.

The application installed on the client computer system does not necessarily have to cooperate as a client server application with a server-side portion while operating. The means of the invention can also be used to download and configure a "stand-alone" application.

In the following, three exemplary environments in which the invented method can be applied will be addressed.

In a first environment, an application from a software producer is offered for download via a browser. If a user on the client computer system decides to download the software, he must first create an account, by entering data about himself, for example, before he is given a link to an installation file for the application. These data comprise, for instance, a user name and a password. A combination of the selected username and the selected password lets the software producer authenticate the future user of the software. An account adds additional personal data to the username, e.g., payment data for the software. Such an account either has already been set up earlier by the user and linked to a username or is set up at the first download. Traditionally, the software producer is interested in offering his commercial software only to those users who have paid the agreed-upon price to download and use the software. After downloading and installing the software, the user may therefore be asked, the first time the application is started, to authenticate himself as rightful user of the software by entering his username and password. This repeated input of the user ID is considered inefficient, since it has already been required to download the software. With the invention as described below, however, it is possible to configure an application after the download and avoid having to re-input the user ID.

In a second environment, again, an application from a software producer is offered for download via a browser. This application, according to the second environment, is an application which requires the input of a user ID in order to be operated, because, for example, identification of the user by his username is required for communication with other users. For example, Skype Technologies SA, Luxembourg, offers an application called "Skype," which allows quasi-realtime communication and data exchange via the Internet. (SKYPE is a trademark of Skype Technologies SA.). In it, a user is identified to other users by a username. When the application is started, an automatic login to a server is required to operate the application. For this purpose, an account is established for the respective username on the server, which requires previous registration and input of user data. For an existing account, the installed application logs in with automatic transmission of the user ID, i.e., username and password, to the server. For a user who wants to obtain the application via a download and then install it, it would be desirable to not have to reconfigure the installed application, i.e., re-input his user ID, since he has already created an account via a web form.

The third environment is based on an offer to download the application or its installation files via a network connection in a company intranet, where a corresponding network drive is enabled automatically with the stored authorization data, i.e., without requiring access-dependent input of the authorization data or user ID. In addition, companies usually have automatic access to company databases, or corporate directories, which assign each employee individual communication data as well as server configurations, enabled network drives, etc. on a call-up basis. For said company networks, a required configuration based on company database entries is desirable after installation of the application, allowing the user to configure the installed application on the local computer system without any additional input. Even if a configuration of an application that is installed for the first time is limited to input from the server assigned to the application, for a company with many employees this means a considerable amount of lost time. Automatic configuration is therefore also desirable in such an environment.

There are already state-of-the-art options for automatic configuration. One method used to date involves installation and initial configuration via a script-controlled process and using software distribution systems. A software distribution system is offered under the name "System Management System" or the abbreviation SMS by Microsoft Corporation, Redmond, Wash., USA. The use and operation of such software distribution systems do, however, involve some related expense and require appropriate programming of the installation onsite.

Also, so-called "discovery methods" have been used so far, wherein a server and a client are supposed to connect via broadcast mechanisms within a network. These methods are cumbersome even in small network architectures. In addition, mechanisms based on the discovery method alone cannot solve the problem of how specific configuration data can be made available.

Below, an embodiment of the invented method is explained using the FIGURE.

The FIGURE shows a server computer system SRV in which a server-side portion of the application has been installed in a storage area (not shown). This installed server-side portion of the application A will assume the role of server application in a future client-server-relationship between the server computer system SRV and a client computer system CLT. A component of the server-side portion of the application A comprises components of the client-side portion of the application IX, which are transmitted to the client computer system via download and installed there.

Depending on download capacity needs, the expert implementing the invented method chooses whether the server-side portion of the application A uninstalls the client-side portion of the application IX, i.e. keeps it in the form of installation data, or whether the files needed on the client computer system are already installed on the server side, i.e., are unpacked there, so they can be transmitted to the client computer system CLT. In the latter case, the application X described later, which is installed on the client system, resembles for the most part the client-side portion of application IX.

On one hand, referring to or downloading the client-side portion of application IX from the server computer system SRV means referring to files from the client-side portion of the application IX installed or pre-installed on the server side, and on the other hand it means, as an alternative, referring to installation files to be installed from the client-side portion of application IX.

In an alternative embodiment of the invention, a configuration component C' can be part of the client-side portion of the application IX, as shown, or (not shown) it can be assigned to the client-side portion of the application IX. This configuration component C' is usually not considered necessary for the embodiment of the invention.

Another component of the server-side portion of the application A comprises a web server application WS.

The dashed-line border and the symbolic representation of the application A portion installed on the server-side already indicates that the organization of the web server application WS and the client-side portion of the application IX is left up to the expert. In some instances, integration of the web server application WS into the client-side portion of the application IX may also be selected.

A user on the client computer system CLT now accesses the web server application WS. This is symbolized by an arrow labeled 1. The user has also received a link or URL which, when input into a browser BRW, addresses the server application WS. Optionally, login credentials are authenticated. The web server application WS now generates a webpage WBP which is shown to the user in the browser BRW as a download page WBP with corresponding user instructions (not shown). The download page loaded in the browser of the client-side computer system also contains configuration data for configuring the client-side portion of the application, which are transmitted invisibly in the source code of the HTML page WBP. In this context, the configuration data are taken from the user's account information or other user-specific configuration data stored on the server computer system SRV or another server (not shown).

Another component of the download page WBP are two control elements LNK, CRT which will be explained in detail below. A first control element LNK constitutes a selectable link LNK to a download of the desired application, more precisely the client-side portion of the application IX. The link therefore refers to the storage location of the client-side portion of the application IX. The user can trigger a download and storage or installation of the client-side portion of the application IX by activating the link LNK, e.g. with a mouse click.

An installed client-side portion of the application on the client computer system is illustrated in the FIGURE with the installed application X and the installed configuration component C. The installation occurs in an area (not shown) of the storage memory on the client computer system which is provided for installing applications.

An installation routine for installing the application X and the installed configuration component C can include an automatic start of the executable configuration component after successful installation of the application X and the configuration component C.

A second control element CRT of the download page WBP is designed, for instance, as a key or button which, when pressed by the user, can trigger a configuration of the already successfully installed application X. Preferably, the second control element is presented as configuration key CRT or marked with the comment "One touch post install configuration", for instance. In this way, it is possible to achieve installation and initial configuration in an advantageous way using the method described below and starting from the same download page WBP.

As an alternative to an automatic start of the configuration component C, after the successful installation, a start can be accomplished by activating the configuration key CRT.

After successful installation and automatic start of the configuration component C, pressing the configuration key CRT by the user initiates automatic configuration of the application X using configuration data transmitted in the source code of the HTML page WBP.

For this purpose, in one embodiment of the invention, a local client-server connection is established between the configuration component C acting as server and the browser BRW acting as client, wherein the configuration data from the download page loaded into the browser via the local client-server connection, e.g., via an HTTP or HTTP/S connection using the HTTP functions HTTP-GET or HTTP-POST, are transmitted to the configuration component.

Such a local client-server connection or local host connection is especially recommended when the security settings of the browser prohibit direct acceptance of the configuration data from a remote location, i.e., the storage location of the web server application WS.

After receiving the configuration data, the configuration component C transmits the configuration data to a storage location set aside for the application X to use for reading access, e.g., the registry or one or more configuration files.

The use of the configuration component C is unnecessary when the browser's security settings allow remote access within a company's intranet. In this case, the client-side portion of the application X is configured with direct use of configuration data from the download page which can be read via the browser BRW.

In an alternative embodiment of the invention, the actions triggered by the two control elements LNK, CRT, i.e., download including installation and initial configuration, are executed automatically in sequence so that the user simply has to activate one control element CRT on the download page.

One example of an application area for this invention are business web applications which are installed on a server in the customer's network. The proposed One Touch Configuration method simplifies the initial configuration of the application that is to be installed and makes manual input after the installation unnecessary.

The method is easier to implement than other comparable methods. User-specific data can be updated generically via the server-side portion of the application A and then routed via the browser on the client computer system CLT to the installed application X.

The invented method can also be used to obtain applications from the Internet, wherein a customer has an account with a service provider. The customer uses his customer login to log into the web pages of the company. The company knows the customer's account information, which applications the customer has bought and can make available additional complementary downloads including a license key for each one. The license key can then simply be transmitted to the installed application using the presented method.

The invention claimed is:

1. A method for configuring an application having a server-side portion of the application installed on a server computer system having a non-transitory storage device and a client-side portion of the application which is to be installed and configured on a client computer system having a non-transitory memory, the method comprising:
   accessing, by the client computer system, a web server application assigned to the server-side portion of the application installed on the server computer system,
   generating a download page by the web server application, wherein the download page comprises configuration data to configure the client-side portion of the application to be installed on the client computer system;
   loading the generated download page into a browser of the client computer system;
   transferring the client-side portion of the application from the server computer system to the client computer system via the browser;
   installing the client-side portion of the application on the client computer system via the browser, and
   configuring the client-side portion of the application by the client computer system after the client-side portion of the application is installed on the client computer system via the browser, the client computer system using the configuration data from the download page loaded into the browser of the client computer system to perform the configuring of the client-side portion of the application after the client-side portion of the application is installed on the client computer system.

2. The method of claim 1, wherein the download page loaded into the browser of the client computer system contains a control element and the method further comprising starting the configuring of the client-side portion of the application installed on the client computer system after activation of the control element.

3. The method of claim 1, wherein the configuring of the client-side portion of the application by the client computer system after the client-side portion of the application is installed on the client computer system occurs automatically via a script-controlled sequence after the client-side portion of the application is installed on the client computer system.

4. The method of claim 1, wherein the configuring of the client-side portion of the application by the client computer system after the client-side portion of the application is installed on the client computer system occurs via entry of the configuration data within source code of the generated download page loaded into the browser in at least one of a registry database on the client computer system and a configuration file on the client computer system.

5. The method of claim 1, comprising authenticating the client computer system at the web server application prior to configuration of the client-side portion of the application installed on the client computer system.

6. The method of claim 5, wherein the authenticating occurs via login.

7. The method of claim 5, wherein the authenticating occurs via transfer of authorization data.

8. The method of claim 1, wherein the configuration data of the generated download page loaded into the browser of the client computer system is comprised of source code identifying the configuration data, and the method further comprises:

the client computer system saving the configuration data received from the generated download page in the non-transitory memory of the client computer system such that the configuring of the client-side portion of the application by the client computer system after the client-side portion of the application is installed on the client computer system results in the configuration data saved in the memory being accessed for user account information to be utilized during the configuration of the of the client-side portion of the application installed on the client computer system.

9. The method of claim 1, wherein the generated download page loaded into a browser of the client computer system results in first and second control elements being activatable, the first control element being activatable to initiate the installation of the client-side portion of the application on the client computer system, the second control element being activatable to initiate the configuring of the client-side portion of the application on the client computer system after the client-side portion of the application on the client computer system is installed on the client computer system.

10. The method of claim 1, wherein the configuring of the client-side portion of the application by the client computer system after the client-side portion of the application is installed on the client computer system is performed such that no manual user input is provided during the configuration of the client-side portion of the application by the client computer system.

11. A method for configuring an application having a server-side portion of the application installed on a server computer system having a non-transitory storage device and a client-side portion of the application which is to be installed and configured on a client computer system having non-transitory memory, the method comprising:

accessing, by the client computer system, a web server application assigned to the server-side portion of the application;

generating a download page by the web server application, wherein the download page contains configuration data to configure the client-side portion of the application to be installed on the client computer system;

loading the generated download page into a browser of the client computer system;

transferring the client-side portion of the application from the server computer system via the browser;

installing the client-side portion of the application as well as a configuration component on the client computer system;

starting the configuration component installed on the client computer system;

establishing a local client-server connection between the browser and the configuration component installed on the client computer system wherein the configuration component is set up as a server and the browser is set up as a client for the established local client-server connection;

transmitting configuration data from the generated download page loaded in the browser to the configuration component installed on the client computer system via the local client-server connection; and configuring the client-side portion of the application installed on the client computer system by the configuration component installed on and being run by the client computer system using the configuration data from the generated download page the configuration component received from the browser.

12. The method of claim 11, comprising setting up the local client-server connection as a member of the group consisting of an HTTP connection and an HTTPS connection.

13. The method of claim 12, comprising deleting the configuration component from the client computer system after successfully configuring the client-side portion of the application installed on the client computer system.

14. The method of claim 12, wherein the configuration data is comprised of a user identification and a password.

15. A communication system comprising:

a server computer system having a non-transitory storage device; and a client computer system communicatively connectable to the server computer system, the client computer system having non-transitory storage memory; and wherein configuration data of a user associated with the client computer system is stored in the non-transitory storage device of the server;

the client computer system configured to access a web server application of the server computer system;

the server computer system configured to generate a download page by the web server application that contains the configuration data of the user, the client computer system configured to load the download page generated by the server computer system into a browser of the client computer system;

the server computer system configured to transfer a client-side portion of an application from the server computer system via the browser;

the client computer system configured to install the client-side portion of the application on the client computer system via the browser in response to the transfer of the client-side portion of the application from the server computer system;

the client computer system configured to configure the client-side portion of the application after the client-side portion of the application is installed on the client computer system via the browser, the client computer system configured to use the configuration data from the download page loaded into the browser of the client computer system to perform the configuring of the client-side portion of the application after the client-side portion of the application is installed on the client computer system.

16. The system of claim 15, wherein the client computer system is configured so that no manual user input is provided during the configuration of the client-side portion of the application installed on the client computer system.

17. The system of claim 16, wherein the configuration data is comprised of user identification for the user and a password of the user.

18. The system of claim 17, wherein the configuration data also comprises at least one license key.

19. The method of claim 4, wherein the configuration data is comprised of at least one license key.

20. The method of claim 19, wherein the configuration data also comprises user data of a user account of a user associated with the client computer system that is stored in the storage device of the server computer system.

* * * * *